United States Patent
Monastyrsky et al.

(10) Patent No.: US 11,449,615 B2
(45) Date of Patent: Sep. 20, 2022

(54) SYSTEM AND METHOD OF FORMING A LOG WHEN EXECUTING A FILE WITH VULNERABILITIES IN A VIRTUAL MACHINE

(71) Applicant: AO Kaspersky Lab, Moscow (RU)

(72) Inventors: Alexey V. Monastyrsky, Moscow (RU); Mikhail A. Pavlyushchik, Moscow (RU); Vladislav V. Pintiysky, Moscow (RU); Denis V. Anikin, Moscow (RU); Dmitry A. Kirsanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 559 days.

(21) Appl. No.: 16/412,499

(22) Filed: May 15, 2019

(65) Prior Publication Data

US 2020/0210591 A1 Jul. 2, 2020

(30) Foreign Application Priority Data

Dec. 28, 2018 (RU) .................................. 2018147237

(51) Int. Cl.
*G06F 21/57* (2013.01)
*G06F 9/455* (2018.01)
*G06F 9/54* (2006.01)

(52) U.S. Cl.
CPC ........ *G06F 21/577* (2013.01); *G06F 9/45558* (2013.01); *G06F 9/542* (2013.01); *G06F 2009/45587* (2013.01); *G06F 2009/45591* (2013.01); *G06F 2221/034* (2013.01)

(58) Field of Classification Search
CPC .... G06F 21/577; G06F 9/45558; G06F 9/542; G06F 2221/034; G06F 2009/45587; G06F 2009/45591; G06F 21/55; G06F 21/53; G06F 11/3466
See application file for complete search history.

(56) References Cited

U.S. PATENT DOCUMENTS

| | | |
|---|---|---|
| 7,779,472 B1 | 8/2010 | Lou |
| 8,479,286 B2 | 7/2013 | Dalcher et al. |
| 8,805,995 B1 * | 8/2014 | Oliver .................. G06F 21/552 709/224 |
| 9,058,492 B1 * | 6/2015 | Satish .................... G06F 21/57 |
| 9,594,912 B1 | 3/2017 | Thioux et al. |

(Continued)

*Primary Examiner* — Shin-Hon (Eric) Chen
*Assistant Examiner* — Abdullah Almamun
(74) *Attorney, Agent, or Firm* — ArentFox Schiff LLP; Michael Fainberg (57) ABSTRACT

Disclosed herein are systems and methods for forming a log during an execution of a file with vulnerabilities. In one aspect, an exemplary method comprises, discovering an activation of a trigger during an execution of a thread of a process created upon opening the file, wherein the trigger describes conditions accompanying an event which relates to an attempt to exploit a vulnerability of the file, analyzing a stack of the process created upon opening the file, and discovering a chain of function calls preceding the event in a form of a sequence of call and return addresses, analyzing the discovered chain of function calls for fulfillment of conditions of the trigger which relate to the attempt to exploit the vulnerability, and when the conditions of the trigger are fulfilled, saving information about the chain of function calls in a log.

20 Claims, 4 Drawing Sheets

(56) References Cited

U.S. PATENT DOCUMENTS

| | | | |
|---|---|---|---|
| 9,734,332 B2* | 8/2017 | Huang | G06F 21/562 |
| 10,049,211 B1* | 8/2018 | Lukacs | G06F 21/566 |
| 11,003,764 B2* | 5/2021 | Shukla | G06F 21/54 |
| 2011/0231936 A1* | 9/2011 | Williams | G06F 21/577 |
| | | | 726/25 |
| 2014/0123286 A1* | 5/2014 | Fischer | G06F 21/552 |
| | | | 726/23 |
| 2014/0380468 A1* | 12/2014 | Gerzon | G06F 21/52 |
| | | | 726/22 |
| 2015/0128266 A1* | 5/2015 | Tosa | G06F 21/566 |
| | | | 726/23 |
| 2015/0339480 A1* | 11/2015 | Lutas | G06F 21/556 |
| | | | 726/22 |
| 2016/0026791 A1* | 1/2016 | Melski | G06F 21/54 |
| | | | 726/25 |
| 2018/0039776 A1* | 2/2018 | Loman | G06F 21/566 |
| 2018/0068115 A1 | 3/2018 | Golovkin et al. | |
| 2018/0096140 A1* | 4/2018 | Bulygin | G06F 9/4486 |
| 2018/0219909 A1* | 8/2018 | Gorodissky | H04L 43/50 |
| 2018/0349603 A1* | 12/2018 | Yamada | G06F 21/554 |
| 2018/0357413 A1 | 12/2018 | Rivera | |

* cited by examiner

SYSTEM AND METHOD OF FORMING A LOG WHEN EXECUTING A FILE WITH VULNERABILITIES IN A VIRTUAL MACHINE

CROSS REFERENCE TO RELATED APPLICATIONS

The present application claims priority to Russian Patent Application No. 2018147237, filed on Dec. 28, 2018, the entire content of which is incorporated herein by reference.

FIELD OF TECHNOLOGY

The present disclosure relates to the field of identifying malicious files to improve computer security, more specifically to systems and methods for forming an execution log when executing a file with vulnerabilities in a virtual machine.

BACKGROUND

At present, there is a growing number of malicious software (such as computer viruses, Trojan horses, Internet worms) designed to cause harm to both user data and to the actual user of the electronic device infected with the malicious software. The harm may be caused by damaging or deleting user files, by using the resources of the computing device of the user for "mining" cryptocurrencies, stealing electronic and confidential user data (correspondence, images, logins, passwords, bank card data), and by other actions. Moreover, malicious software is constantly changing; the creators of the malicious software resort to ever newer mechanisms of attack and employ newer defensive techniques against security applications. Various mechanisms are employed, such as obfuscation of the malicious code (e.g., by changing the original text or executable program code into a form which preserves its functionality, yet impedes analysis, understanding of the working algorithms, and modification during decompiling) or the use of mechanisms for resisting emulation (e.g., by including, within the malicious software, features for recognizing when the malicious software is being run in an emulator such that the malicious software does not display its malicious activity while being run in the emulator).

Furthermore, malicious software often does not manifest its malicious activity immediately after being launched, but instead performs a multitude of calls of Application Program Interface (API) functions (in the order of millions of calls of API functions) and enormous cycles (in the order of billions of iterations), and stops working for a certain time immediately after being launched (for example, for one hour by using the "Sleep( )" function). User computing devices at present have high performance and multiple-core processors (there are also multiprocessor systems), so that the user might not notice or attach importance to the workload of one of the cores. Moreover, a user normally uses the device for longer than one hour after it has been turned on. Therefore, there is no need for a malicious program, if it has launched, to manifest its activity straight away.

Malicious programs and applications which employ vulnerabilities of other programs or components and modules of operating systems (i.e., exploit vulnerabilities) are also used. As long as a vulnerable program has not been installed on the user's computing device, or the wrong version of a vulnerable program has been installed, the malicious application may not manifest its activity in any way.

In order to combat the aforementioned techniques, the makers of security applications (such as antivirus applications) employ methods with the use of virtual machines in the form of an isolated environment for safe execution of files. Oftentimes such virtual machines are known as sandboxes. The hypervisors, under the control of which such virtual machines run, contain mechanisms for intercepting the functions that are called by the applications which are being executed in them.

It should be noted that security applications employ various methods for determining malicious software, such as signature and/or heuristic analysis. If in the course of the analysis no maliciousness has been determined for a file, it may be handed over, by the security application, to the aforementioned virtual machine for analysis of its behavior. For example, if the security application does not have the digital signature of a trusted software maker, the file may be handed over to the virtual machine for analysis. The file handed over is then executed in the virtual machine, and in the course of the execution, actions and events of the file being executed by calling different functions are intercepted. The intercepted events and actions are saved in a log. Then, the events and actions that are in the log are analyzed by the security application or by an expert in information security. Thus, in the technique described above, systems for intercepting and aggregation of events and actions work in two steps. In the first step, information is gathered; in the second step, it is analyzed.

One of the shortcomings of the above technique is that the method does not influence the process of execution during the execution of a file. For example, if the process launched from the file being analyzed (or from the application which opened the file being analyzed) has halted its execution for an hour or is attacking some email client or messenger (a program for exchanging messages) by accessing a file with saved passwords, the program being attacked is not present in the virtual machine, and the maliciousness of the behavior of the process will not be revealed. In other words, when the malicious process does not find the required file with passwords, the malicious process finishes its execution by itself and not manifest harmful activity. Moreover, in the event that malicious applications are present on the computing device of the user that employ vulnerabilities of other programs or components of operating systems, it is also necessary to identify such applications prior to their exploitation of the vulnerabilities of the aforementioned other programs, since the computing device of the user cannot be considered secure in this case. Moreover, when the wrong version of a vulnerable application has been installed on the computing device of the user and the computing device contains a malicious program utilizing the vulnerabilities of the application, it is hard to identify such a malicious program; the malicious program finishes without performing malicious actions or utilizing the vulnerability (e.g., due to the wrong version of the vulnerable application being installed).

Hence, there is a need to improve how event are gathered when a file is being executes in a virtual machine.

SUMMARY

Aspects of the disclosure relate to the field of computer security, more specifically to systems and methods for forming an execution log when executing a file with vulnerabilities in a virtual machine.

In one exemplary aspect, a method is implemented in a computer comprising a hardware processor, the method comprising: discovering an activation of a trigger during an execution of a thread of a process created upon opening the file, wherein the trigger describes conditions accompanying an event which relates to an attempt to exploit a vulnerability of the file, analyzing a stack of the process created upon opening the file, and discovering a chain of function calls preceding the event in a form of a sequence of call and return addresses, analyzing the discovered chain of function calls for fulfillment of conditions of the trigger which relate to the attempt to exploit the vulnerability, and when the conditions of the trigger are fulfilled, saving information about the chain of function calls in a log.

According to one aspect of the disclosure, a system is provided for forming an execution log when executing a file with vulnerabilities in a virtual machine, the system comprising a hardware processor configured to: discover an activation of a trigger during an execution of a thread of a process created upon opening the file, wherein the trigger describes conditions accompanying an event which relates to an attempt to exploit a vulnerability of the file, analyze a stack of the process created upon opening the file, and discover a chain of function calls preceding the event in a form of a sequence of call and return addresses, analyze the discovered chain of function calls for fulfillment of conditions of the trigger which relate to the attempt to exploit the vulnerability, and when the conditions of the trigger are fulfilled, save information about the chain of function calls in a log.

In one exemplary aspect, a non-transitory computer-readable medium is provided storing a set of instructions thereon for forming an execution log when executing a file with vulnerabilities in a virtual machine, wherein the set of instructions comprises instructions for: discovering an activation of a trigger during an execution of a thread of a process created upon opening the file, wherein the trigger describes conditions accompanying an event which relates to an attempt to exploit a vulnerability of the file, analyzing a stack of the process created upon opening the file, and discovering a chain of function calls preceding the event in a form of a sequence of call and return addresses, analyzing the discovered chain of function calls for fulfillment of conditions of the trigger which relate to the attempt to exploit the vulnerability, and when the conditions of the trigger are fulfilled, saving information about the chain of function calls in a log.

In one aspect, the method further comprises saving a dump of the memory region connected with the fulfillment of the conditions of the trigger in the log.

In one aspect, the event includes at least one of: a calling of an API function during the execution of the thread of the process; a return from an API function; a system call (e.g., an accessing of the kernel of the operating system by the thread to execute some operation); a return from a system call; and a receiving of a notification from an operating system.

In one aspect, the triggers describe one or more events and conditions accompanying the events, the events relating to the attempt to exploit the vulnerability of the file: a generating of an event from a chain of calls which utilizes return oriented programming (ROP); a generating of an event by execution on a heap; a generating of an event by execution on a stack; a changing of the stack; an alteration of a data structure describing rights and privileges of a process in an operating system; an event generated by a first execution from a memory page; and a dynamic allocation of memory and placement of objects the dynamically allocated memory.

In one aspect, the opening of the file includes one of: the execution of the file, when the file is executable; or the opening of the file by an application, when the file is not executable.

In one aspect, a security module performs at least one of: launching the virtual machine; or selecting the security module from previously created virtual machines.

In one aspect, the trigger describes: the actual event, the occurrence of which activates the trigger, and the conditions of the trigger accompanying the actual event which relate to the attempt to exploit the vulnerability of the file.

The forming of the execution log when executing a file with vulnerabilities in accordance with the teachings of the present disclosure improves computer security. The improvement is achieved: by discovering an activation of a trigger during an execution of a thread of a process created upon opening the file, wherein the trigger describes conditions accompanying an event which relates to an attempt to exploit a vulnerability of the file, analyzing a stack of the process created upon opening the file, and discovering a chain of function calls preceding the event in a form of a sequence of call and return addresses, analyzing the discovered chain of function calls for fulfillment of conditions of the trigger which relate to the attempt to exploit the vulnerability, and when the conditions of the trigger are fulfilled, saving information about the chain of function calls in a log.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for forming a log (i.e., an execution log) during an execution of a file with vulnerabilities in a virtual machine. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

A virtual machine, in the form of an environment for a safe file execution, comprises a set (complex) of software and hardware providing resources of a host Operating System (OS) to a guest OS, wherein the guest OS has no link to the host OS.

Modules of a system for analysis of a file for maliciousness in a virtual machine comprise actual devices, system, component, and groups of components, realized a use of hardware, such as integrated microcircuits (e.g., Application—Specific Integrated Circuits (ASICs)) or Field—Programmable Gate Arrays (FPGAs), or in the form of a combination of software and hardware such as a microprocessor system and a set of program instructions, and also based on neuro-synaptic chips. The functionality of the indicated modules of the system may be realized exclusively by hardware, and also in the form of a combination, where some of the functionality is realized by software and some by hardware. In certain variant aspects, some of the modules or all of the modules can be implemented on the processor of a general-purpose computer (such as the one depicted in FIG. 4). Furthermore, the components (each of the modules) of the system may be realized within a single computing device or distributed among several interconnected computing devices.

Figure 1:
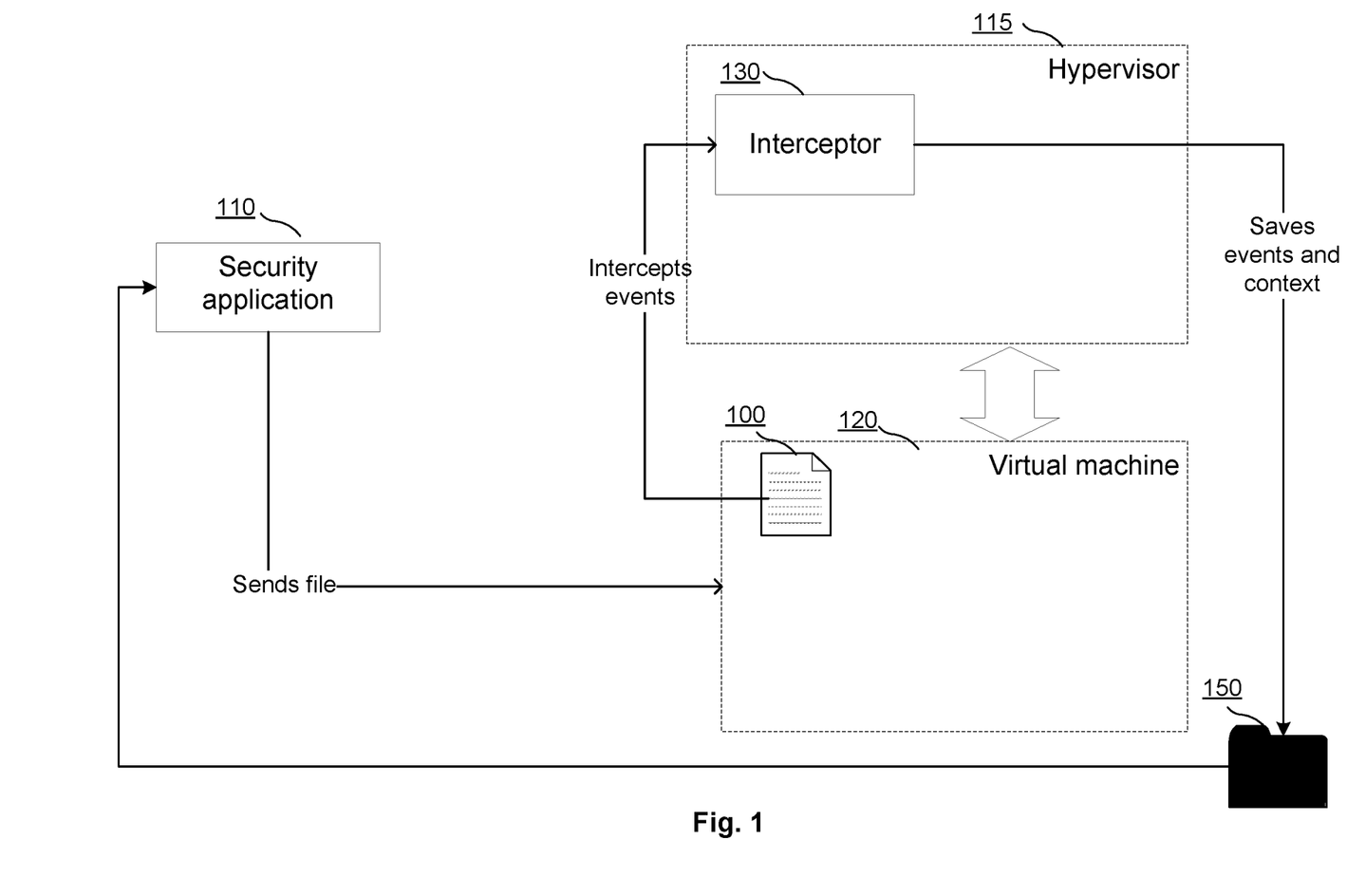
FIG. 1 is a block diagram illustrating an example of an analysis of a file for maliciousness in a virtual machine in accordance with aspects of the present disclosure.

FIG. 1 is a block diagram illustrating an example of an analysis of a file 100 for maliciousness in a virtual machine in accordance with aspects of the present disclosure. A security module 110 sends the file 100 to a virtual machine 120. Then, in order to perform the analysis, the file 100 is opened on the virtual machine 120 in a form of an isolated environment for the execution of files. In one aspect, the virtual machine 120 is launched by the security module 110. In one aspect, the virtual machine 120 is selected by the security module 110 from previously created virtual machines.

The file 100 of the present disclosure may comprise one or more of: an executable file, a dynamic library, a script being executed by an interpreter (e.g., Microsoft PowerShell files with extension .ps1); files containing scripts for execution (such as files of Microsoft Office or Adobe Acrobat formats); a web page; an image; other standard files which can cause harm to data of a user of a computing device when utilized (for instance, when executed or opened by other applications). In one aspect, the file 100 may comprise a link (such as a Universal Resource Locator (URL)).

In a general aspect of the present disclosure, the analysis of the file 100 for maliciousness is done after the file is opened in the OS of the virtual machine 120. The opening of the file 100 includes performing one of the following:

executing the file 100, if the file 100 is executable; and
opening of the file 100 by an application, if the file 100 is not executable.

The result of the opening of the file 100 is a creation of a process and a launching of the created process for execution in the virtual machine 120. At least one thread is created during the execution.

In one aspect, the security module 110 and a monitor of virtual machines 115 (hereinafter referred to as a "hypervisor"), under the control of which the virtual machine 120 is operating, are implemented on the computing device of the user. In one aspect, the security module 110 is a security application (such as an antivirus application). In another aspect, the security module 110 and the hypervisor 115 are implemented on a remote server (or on different servers), or as a cloud service. If the security module 110 is implemented on a remote server or as a cloud service, the security module 110 obtains the file 100 from third party sources (for example, from security module 110 running on computing devices of a user), and hands it over to the virtual machine 120. Then, the opening of the file 100 occurs at the virtual machine.

In one aspect, the hypervisor 115 contains an interceptor 130 (the interceptor 130 is a module, a component, or a functional part of the hypervisor 115). The interceptor 130 intercepts the calls of API functions by the threads of the process created upon opening the file 100 in the virtual machine 120, and reads the context of the processor on which the thread which was calling the API function is being executed.

It should be noted that the processor context contains at least the values of the processor registers. In one aspect, the interceptor 130 also reads the contents of the stack of function calls using previously read data contained in the processor registers pertaining to the stack (for example, memory address from the registers Extended Stack Pointer (ESP) and Extended Base Pointer (EBP)). Furthermore, the interceptor 130 aggregates the aforementioned data, saves the aggregated data (for example, in a database or in the log 150), and sends the saved data to the security module 110 after executing the process created upon opening the file 100. In turn, the security module 110 gives a verdict as to the maliciousness of the file 100 on the basis of the data from the interceptor 130. In aspects of the present disclosure, the verdict is given after the analysis of the saved data. For example, the verdict may depend on the sequence and the parameters used for the calling of the API functions by the threads of the process created upon opening the file 100. In one aspect, if no verdict has been given, the data saved by the interceptor 130 is sent by the security module 110 to a specialist in information security for analysis (not shown in FIG. 1).

Figure 2:
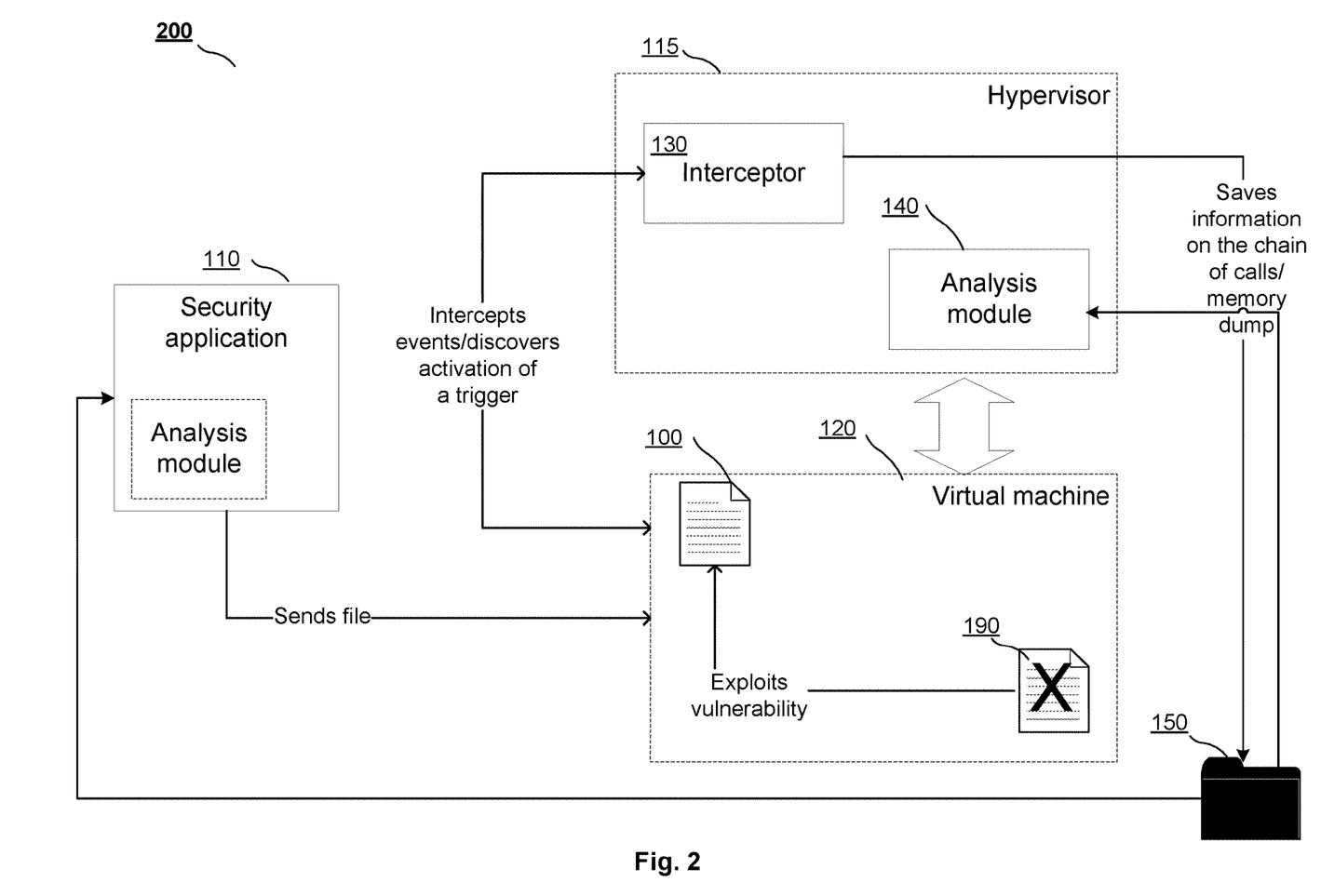
FIG. 2 is a block diagram illustrating an exemplary system for forming an execution log when executing a file with vulnerabilities in a virtual machine in accordance with aspects of the present disclosure.

FIG. 2 is a block diagram illustrating an exemplary system 200 for forming an execution log when executing a file with vulnerabilities in a virtual machine in accordance with aspects of the present disclosure. The system of the present disclosure is advantageous in that the file 100 is safe, while the proposed system contains, along with the interceptor 130, also an analysis module 140. In one aspect, the hypervisor 115 contains the analysis module 140. In another aspect, the analysis module 140 is a component (module, functional part) of the security module 110.

In aspects of the present disclosure, the interceptor 130 intercepts events in the threads of the process created upon opening the file 100. In one aspect, the event are one or more of:

the calling of an API function during the execution of a thread of the process;
the return from an API function;
a system call (i.e., or, an accessing of the kernel of the OS by the thread to execute some operation;
the return from a system call; and
a message (e.g., a notification) from the OS (e.g., indicating the creation of a thread, the creation of a process, the loading of a module).

In the event of an intercepting of an event, the execution of the thread is halted by the interceptor 130. The execution of the thread is halted by stopping the execution of the instructions of the thread.

It should be noted that an intercepting is possible on different rings of protection of the OS of the virtual machine 120, which realize a hardware partitioning of the system and user levels of privileges. In one aspect, the interception on different rings of protection of the OS may provide interceptions of events at: the kernel level (kernel mode) and/or the user level (user mode).

In one aspect of the present disclosure, during the execution of the threads of the process created upon opening the file 100, the interceptor 130 determines the coding convention of the API functions being called by the threads. The determination of the coding convention allows an unambiguous determination of the use of the registers of the processor for the transmittal of parameters to the API functions being called. Thus, for example, the parameters of the calls will be found in: the Extended Count Register (ECX), which contains the first parameter, the Extended Data Register (EDX), which contains the second parameter, and the register for Extended Stack Pointer (ESP), which contains the rest of the parameters. Furthermore, the determination of the coding convention enables an unambiguous determination of the values being returned. For example, if an API function returns the value "0", this is done in the register EAX (Extended Accumulator Register).

Returning to FIG. 2, the malicious application 190 is exploiting the vulnerabilities of the file 100. However, the malicious application 190 might not manifest itself, as was originally conceived by the hacker, on versions of the file 100 different from those for which the aforementioned malicious code was originally designed. For example, a given malicious application 190 utilizing vulnerabilities of Microsoft Office version 2013.1 might not manifest malicious activity on Microsoft Office version 2013.2. In this case, the malicious application 190 or Microsoft Office itself will terminate with an exception, or, if the malicious application 190 is well devised, after checking the exploitation of vulnerability, malicious application 190 will finish its work and not generate any activity (events). The malicious application 190 may also work successfully, but not launch any additional process, and instead work within the application being exploited (the process created upon opening the file 100). In this case, the computing device of the user cannot be considered safe, even if the malicious application 190, which is capable of utilizing the vulnerabilities of the file 100, has not executed malicious actions. It is necessary to identify an instance the actions performed by the malicious application 190 being realized on account of the presence of a vulnerability in the file 100 and subsequent exploitation of the file 100, regardless of the result and the success of the actions of the malicious application 190. Moreover, since the method of the present disclosure enables interception of events on the level of the kernel, the events on the level of the kernel may be used to identify a malicious application 190 exploiting vulnerabilities of the components (files) of the operating system.

In one aspect, the interceptor 130 utilizes a set of triggers. In one aspect, the triggers are kept in a database and selected from the database at the time of launching the virtual machine. In aspects of the present disclosure, the triggers describe the actual events, the occurrence of which, activates the trigger, and the conditions accompanying the actual events, where the conditions involve an attempt to exploit a vulnerability. Thus, for example, the triggers describe a set of specific API functions, system calls, and notifications of the operating system, and the conditions of their occurrence that can be utilized when exploiting vulnerabilities.

In one aspect, the triggers describe at least the following events and conditions accompanying the events which involve an attempt to exploit vulnerability:

the generating of an event from a chain of calls which utilizes return oriented programming (ROP);

the generating of an event by execution of code on the heap;

the generating of an event by execution of code on the stack;

changing of the stack;

alteration of the data structure describing the rights and privileges of a process in the operating system (if the malicious application 190 is utilizing vulnerabilities of the kernel of the operating system, this may result in some application obtaining rights which it did not have previously);

an event generated by the first execution from a memory page; and dynamic allocation of memory and placement of objects therein.

The discovery by the interceptor 130 of an event of which the occurrence activates a trigger, and of the fulfillment of the accompanying conditions of the trigger, is not the same as an attempt at exploitation of a vulnerability of a secure file 100 by the malicious application 190, yet it indicates with a high degree of probability that the file 100 has vulnerabilities and the malicious application 190 is attempting to utilize the existing vulnerabilities. The method of the present disclosure makes discovery possible: whether a trigger has been activated during the execution of legitimate code (e.g., a secure code contained in the file 100 and in the modules which this file uses during its execution) or during the execution of the threads of the process created upon opening the file 100, or whether the transfer of control has taken place in another way, for example, due to overwriting of data kept on the stack, heap overflow, and so forth.

In the event of the activation of a trigger, the interceptor 130 analyzes the stack of the process created upon opening the file 100, and identifies the sequence of function calls preceding the event, wherein the interceptor 130 identifies the sequence of function calls in the form of a sequence of call and return addresses. Next, the interceptor 130 analyzes the sequence of function calls so identified for the fulfillment of the conditions of the trigger (for example, the addresses of calls not belonging to the modules loaded upon opening of the file 100).

In the event of fulfillment of the conditions of the trigger, the interceptor 130 saves the data (information) on the identified sequence of function calls in the log 150.

In one aspect, the interceptor 130 also saves, in the log 150, the dump of the memory region associated with the fulfillment of the accompanying conditions of the trigger.

In order to illustrate the teachings, examples of the operations of the present system are provided below.

EXAMPLE 1

The interceptor 130 has discovered an event: an API function has been called for which a trigger was activated. The interceptor 130 checks the ESP register, and identifies one by one the addresses of the function calls to determine where the API function call came from. If the code which called the API function is not found in the module or dynamic library that have been loaded into the address space of the process created upon opening the file 100 (that is, the code is located at an anomalous address), then it is necessary to carry out the above described actions, namely: save information about the sequence of identified calls in the log 150, including the anomalous address of the call, and also save the dump of the memory region around the anomalous address in the log 150.

EXAMPLE 2

The interceptor 130 has discovered an event: an API function has been called for which a trigger was activated. The interceptor 130 checks the ESP register, and checks for the presence of a return oriented programming (ROP) chain on the stack. If the chain is found, the memory dump (stack) is saved in the log 150 for further analysis.

EXAMPLE 3

The interceptor 130 has discovered an event: a return from an API function for which a trigger was activated. The interceptor checks the return address of the API function. If the return address indicates a heap or stack, the return address and the dump of the heap or stack are saved in the log 150.

EXAMPLE 4

The interceptor 130 has discovered an event: a first instance of an execution on a certain memory page. The interceptor analyzes the memory page; if the page does not correspond to the loaded modules and libraries, it is possible to save the address of the memory page from which the first instance of execution occurred, and also the contents of the memory page itself for further analysis, e.g., in the log 150.

EXAMPLE 5

If the exploitation of vulnerability occurs in several steps, then at first the malicious application 190 allocates a certain quantity of memory (for example, allocation of a heap), in which memory objects will be placed (such as data structures, executable code), and then an attempt is made to transfer control to this memory. The interceptor 130 discovers an event: a dynamic memory allocation. Even in the case when control was not transferred (for example, because the versions of the vulnerable file 100 do not match up), the interceptor 130 records the dump of the allocated memory with the objects placed therein and sends on the recorded dump for further analysis.

EXAMPLE 6

The interceptor 130 discovers an event: the data structure describing the privileges of a process in the operating system has been altered. In the given case, an exploitation of a vulnerability of the kernel of the operating system is likely. The interceptor 130 saves, in the log 150 for further analysis, the stack of function calls which generated the intercepted event, the data structure describing the privileges of the process, and the memory dump of the process.

Returning to the description of the various aspects, it should be understood that it is not advisable for the interceptor 130 to perform all of the above described actions for each event, as this will result in a significant lowering of performance during the execution of the file 100 in the virtual machine and a significant increase in the size of the log 150. Therefore, the accompanying conditions of the trigger must be fulfilled. The intercepted event, the context of the processor and the data obtained as a result of the activation of a tag is saved by the interceptor 130 in the log 150. After being saved, the log 150 is sent by the interceptor 130 to the analysis module 140.

In aspects of the present disclosure, for the analysis of the data saved in the log 150 by the interceptor 130, the analysis module 140 uses methods ordinarily known in the art (such as signature or heuristic analysis).

Thus, the system of FIG. 2 makes detection, in the virtual machine, of a presence of a malicious application 190 exploiting vulnerabilities of the file 100 or components of the operating system, the detection being on the basis of the log 150 formed by the interceptor 130.

Figure 3:
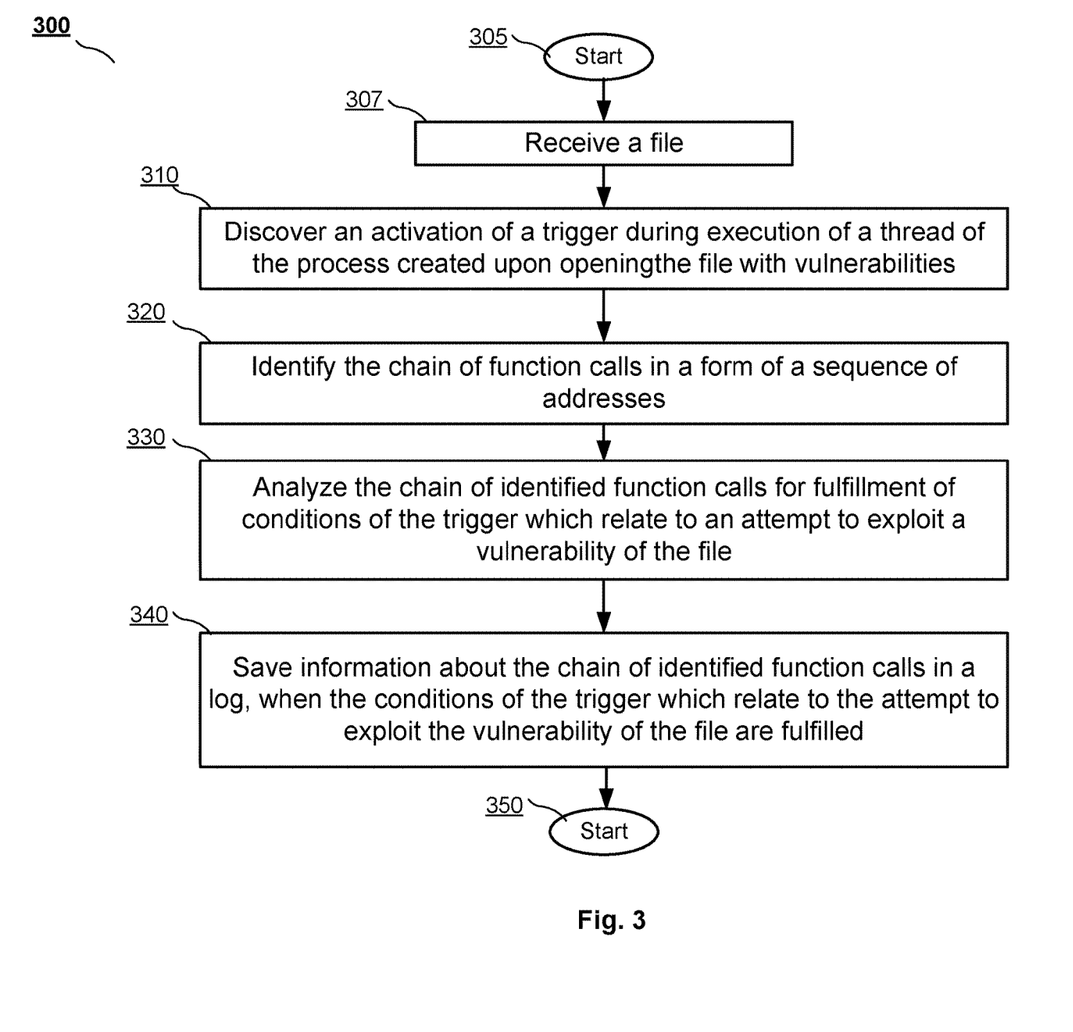
FIG. 3 is a flow diagram illustrating an exemplary method for forming a log during an execution of a file with vulnerabilities in a virtual machine.

FIG. 3 is a flow diagram illustrating an exemplary method 300 for forming a log during an execution of a file with vulnerabilities in a virtual machine.

In aspects of the present disclosure, for the forming of the log 150, the security module 110 sends a secure file 100 to the virtual machine 120. The forming of the log 150 occurs after reception and opening the file 100 in the operating system of the virtual machine 120. Method 300 starts in step 305 and proceeds to step 307.

In step 307, the method receives and opens a file, e.g., the file 100.

In one aspect, the opening of the file 100 includes one of the following: execution of the file, when the file is executable; or opening of the file by an application, when the file is not executable.

In step 310, method 300 discovers, by the interceptor 130, an activation of a trigger during an execution of a thread of a process created upon opening the received file, e.g., the file 100, wherein the trigger describes one or more conditions accompanying an event which relates to an attempt to exploit a vulnerability of the file.

In one aspect, the events are at least one of the following:
- a calling of an API function during the execution of the thread of the process;
- a return from an API function;
- a system call (e.g., an accessing of the kernel of the operating system by the thread to execute some operation);
- a return from a system call; and
- a receiving of a notification from an operating system.

In aspects of the present disclosure, the triggers describe (i) the actual event, the occurrence of which activates the trigger, and (ii) the conditions accompanying the actual event which relate to the attempt to exploit the vulnerability of the file.

In one aspect, the triggers describe one or more of the following events and conditions accompanying the events which relate to the attempt to exploit the vulnerability of the file:
- a generating of an event from a chain of calls which utilizes return oriented programming (ROP);
- a generating of an event by execution on a heap;
- a generating of an event by execution on a stack;
- a changing of the stack;
- an alteration of a data structure describing rights and privileges of a process in an operating system;
- an event generated by a first execution from a memory page; and
- a dynamic allocation of memory and placement of objects the dynamically allocated memory.

In step 320, method 300 analyzes, by the interceptor 130, a stack of the process created upon opening the file, and discovers a chain of function calls preceding the event in a form of a sequence of call and return addresses.

In step 330, method 300 analyzes, by the interceptor 130, the discovered chain of function calls for fulfillment of conditions of the trigger which relate to the attempt to exploit the vulnerability.

In step 340, when the conditions of the trigger, which relate to the attempt to exploit the vulnerability of the file 100, are fulfilled, the method 300, saves, by the interceptor 130, information about the chain of function calls in a log 150. In other words, the result of the analysis, in step 330, is saved in the log 150.

In one aspect, the interceptor 130 also saves a dump of the memory region connected with the fulfillment of the conditions of the trigger in the log 150.

As described above, the present disclosure describes systems and methods for improving security of computers. One advantage of the method of the present disclosure is to execute a file with vulnerabilities in a virtual machine, wherein an execution log is formed which contains data on the events connected with the possible exploitation of the vulnerabilities of that file.

Figure 4:
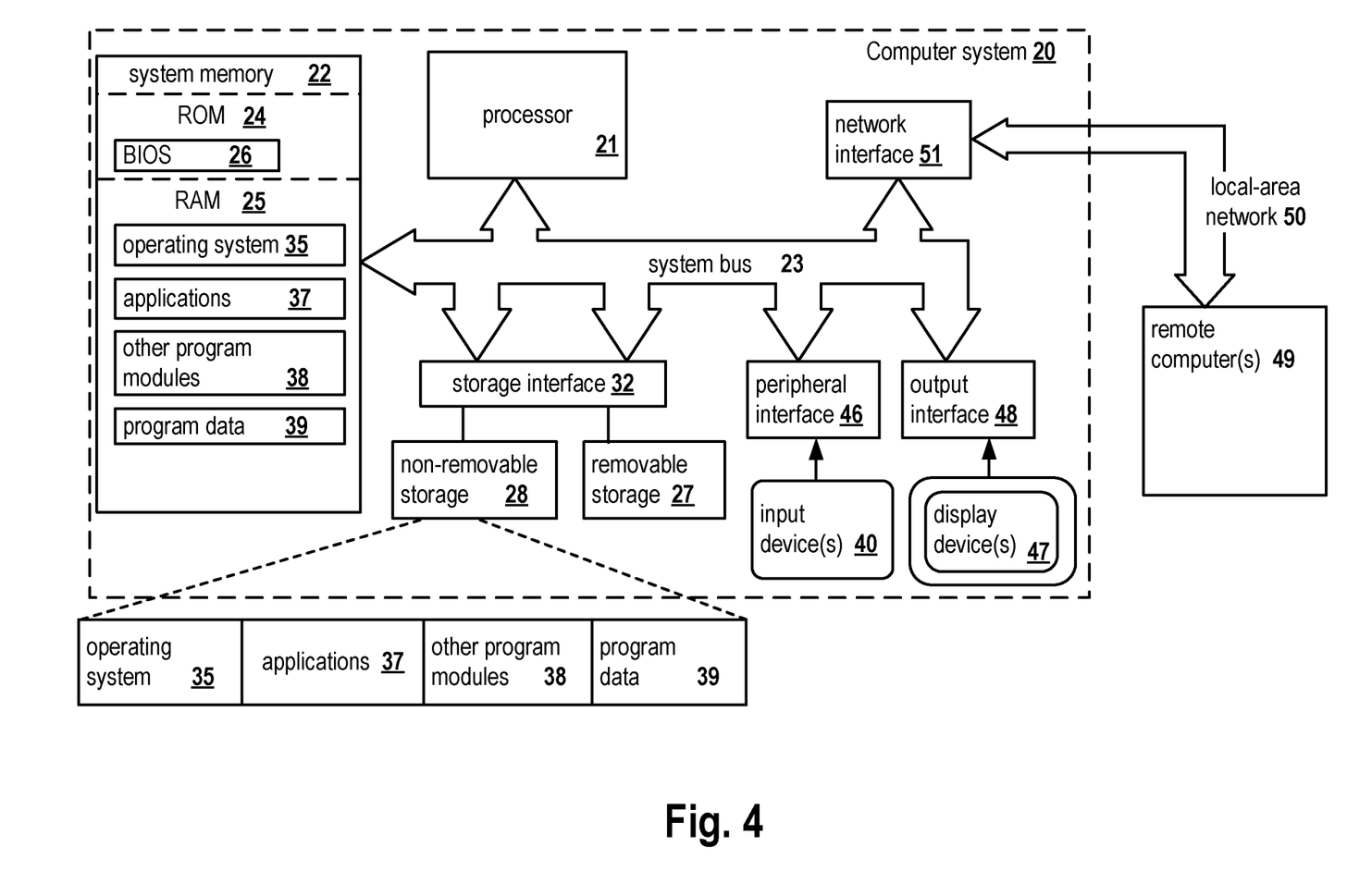
FIG. 4 presents an example of a general-purpose computer system on which aspects of the present disclosure can be implemented.

FIG. 4 is a block diagram illustrating a computer system 20 on which aspects of systems and methods for forming a log during an execution of a file with vulnerabilities in a virtual machine may be implemented in accordance with an exemplary aspect. It should be noted that the computer system 20 can correspond to virtual machine on a computing device, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for forming a log during an execution of a file with vulnerabilities in a virtual machine, the method comprising:
   discovering, by an interceptor, an activation of a trigger during an execution of a thread of a process created upon opening the file, wherein the trigger describes at least an event that performs an alteration of a data structure describing rights and privileges of a process in an operating system and, one or more conditions accompanying the event which relates to an attempt to exploit a vulnerability of the file;
   analyzing, by the interceptor, a stack of the process created upon opening the file, and discovering a chain of function calls preceding the event in a form of a sequence of call and return addresses;
   analyzing, by the interceptor, the discovered chain of function calls for fulfillment of conditions of the trigger which relate to the attempt to exploit the vulnerability; and
   when the conditions of the trigger, which relate to the attempt to exploit the vulnerability of the file, are fulfilled, saving, by the interceptor, information about the chain of function calls in a log.

2. The method of claim 1, further comprising:
   saving a dump of a memory region connected with the fulfillment of the conditions of the trigger in the log.

3. The method of claim 1, wherein the event includes at least one of:
   a calling of an API function during the execution of the thread of the process;
   a return from an API function;
   a system call;
   a return from a system call; and
   a receiving of a notification from an operating system.

4. The method of claim 1, wherein the triggers describe one or more further events and conditions accompanying the one or more further events, the events relating to the attempt to exploit the vulnerability of the file, the one of more further events including at least one of:
   a generating of an event from a chain of calls which utilizes return oriented programming (ROP);
   a generating of an event by execution on a heap;
   a generating of an event by execution on a stack;

a changing of the stack;
an event generated by a first execution from a memory page; and
a dynamic allocation of memory and placement of objects the dynamically allocated memory.

5. The method of claim 1, the opening of the file including one of:
the execution of the file, when the file is executable; or
the opening of the file by an application, when the file is not executable.

6. The method of claim 1, wherein a security module performs at least one of:
launching the virtual machine; or
selecting the security module from previously created virtual machines.

7. The method of claim 1, wherein the trigger describes: the actual event, the occurrence of which activates the trigger, and the conditions of the trigger accompanying the actual event which relate to the attempt to exploit the vulnerability of the file.

8. A system for forming a log during an execution of a file with vulnerabilities in a virtual machine instantiated on a computing device, comprising:
at least one hardware processor configured to:
discover, by an interceptor, an activation of a trigger during an execution of a thread of a process created upon opening the file, wherein the trigger describes at least an event that performs an alteration of a data structure describing rights and privileges of a process in an operating system and, one or more conditions accompanying the event which relates to an attempt to exploit a vulnerability of the file;
analyze, by the interceptor, a stack of the process created upon opening the file, and discover a chain of function calls preceding the event in a form of a sequence of call and return addresses;
analyze, by the interceptor, the discovered chain of function calls for fulfillment of conditions of the trigger which relate to the attempt to exploit the vulnerability; and
when the conditions of the trigger, which relate to the attempt to exploit the vulnerability of the file, are fulfilled, save, by the interceptor, information about the chain of function calls in a log.

9. The system of claim 8, the processor further being configured to:
save a dump of a memory region connected with the fulfillment of the conditions of the trigger in the log.

10. The system of claim 8, wherein the event includes at least one of:
a calling of an API function during the execution of the thread of the process;
a return from an API function;
a system call;
a return from a system call; and
a receiving of a notification from an operating system.

11. The system of claim 8, wherein the triggers describe one or more further events and conditions accompanying the one or more further events, the events relating to the attempt to exploit the vulnerability of the file, the one of more further events including at least one of:
a generating of an event from a chain of calls which utilizes return oriented programming (ROP);
a generating of an event by execution on a heap;
a generating of an event by execution on a stack;
a changing of the stack;
an event generated by a first execution from a memory page; and
a dynamic allocation of memory and placement of objects the dynamically allocated memory.

12. The system of claim 8, the opening of the file including one of:
the execution of the file, when the file is executable; or
the opening of the file by an application, when the file is not executable.

13. The system of claim 8, wherein a security module performs at least one of:
launching the virtual machine; or
selecting the security module from previously created virtual machines.

14. The system of claim 8, wherein the trigger describes: the actual event, the occurrence of which activates the trigger, and the conditions of the trigger accompanying the actual event which relate to the attempt to exploit the vulnerability of the file.

15. A non-transitory computer readable medium storing thereon computer executable instructions for forming a log during an execution of a file with vulnerabilities in a virtual machine, including instructions for:
discovering an activation of a trigger during an execution of a thread of a process created upon opening the file, wherein the trigger describes at least an event that performs an alteration of a data structure describing rights and privileges of a process in an operating system and, one or more conditions accompanying the event which relates to an attempt to exploit a vulnerability of the file;
analyzing a stack of the process created upon opening the file, and discovering a chain of function calls preceding the event in a form of a sequence of call and return addresses;
analyzing the discovered chain of function calls for fulfillment of conditions of the trigger which relate to the attempt to exploit the vulnerability; and
when the conditions of the trigger, which relate to the attempt to exploit the vulnerability of the file, are fulfilled, saving information about the chain of function calls in a log.

16. The non-transitory computer readable medium of claim 15, the instructions further comprising:
saving a dump of a memory region connected with the fulfillment of the conditions of the trigger in the log.

17. The non-transitory computer readable medium of claim 15, wherein the event includes at least one of:
a calling of an API function during the execution of the thread of the process;
a return from an API function;
a system call;
a return from a system call; and
a receiving of a notification from an operating system.

18. The non-transitory computer readable medium of claim 15, wherein the triggers describe one or more further events and conditions accompanying the one or more further events, the events relating to the attempt to exploit the vulnerability of the file, the one of more further events including at least one of:
a generating of an event from a chain of calls which utilizes return oriented programming (ROP);
a generating of an event by execution on a heap;
a generating of an event by execution on a stack;
a changing of the stack;
an event generated by a first execution from a memory page; and a dynamic allocation of memory and placement of objects the dynamically allocated memory.

19. The non-transitory computer readable medium of claim 15, the opening of the file including one of:
the execution of the file, when the file is executable; or
the opening of the file by an application, when the file is not executable.

20. The non-transitory computer readable medium of claim 15, wherein a security module performs at least one of:
launching the virtual machine; or
selecting the security module from previously created virtual machines.

* * * * *